No. 878,763. PATENTED FEB. 11, 1908.
J. BIM.
WEFT REPLENISHING MECHANISM FOR LOOMS.
APPLICATION FILED DEC. 30, 1904.

Witnesses:

Inventor:
Josef Bim
by H. van Oedenneel?
Attorney

No. 878,763. PATENTED FEB. 11, 1908.
J. BIM.
WEFT REPLENISHING MECHANISM FOR LOOMS.
APPLICATION FILED DEC. 30, 1904.

Witnesses:

Inventor:
Josef Bim
by H van Idenen
Attorney

UNITED STATES PATENT OFFICE.

JOSEF BIM, OF VIENNA, AUSTRIA-HUNGARY, ASSIGNOR TO UNION BANK, OF VIENNA, AUSTRIA-HUNGARY.

WEFT-REPLENISHING MECHANISM FOR LOOMS.

No. 878,763.     Specification of Letters Patent.     Patented Feb. 11, 1908.

Application filed December 30, 1904. Serial No. 238,952.

*To all whom it may concern:*

Be it known that I, JOSEF BIM, textile engineer, subject of the Emperor of Austria-Hungary, residing at Vienna, Kolingasse 19, Austria-Hungary, have invented new and useful Improvements in Weft-Replenishing Mechanism for Looms, of which the following is a specification.

The subject of the present invention is a mechanism for looms with automatic change weft feed by means of which when the weft runs out the bobbin changing mechanism is set in operation by a weft thread guard, or the bobbin mechanism is supplemented by a weft feeler which when the weft on the bobbins has been used up to a certain point undergoes by the agency of appropriate media such a displacement as to cause a change of bobbins.

The mechanism for the purpose is constructed in such a way that the control of the bobbin change arrangement can either be carried into effect by the weft thread guard consisting of the weft fork or by the weft feeler according to which is preferred, the weft fork being used when plain goods are being produced and the feeler in case of fancy goods. In producing plain goods when a breakage of a thread takes place or the supply of weft runs out it is sufficient that a change of bobbins takes place and the loom is stopped when this happens twice in succession which may be the case if the bobbin changing mechanism does not work properly. On the other hand, for goods of a figured or fancy description, the bobbin changing mechanism must operate before the weft bobbin is completely exhausted while in this case every time a weft thread breaks or for any reason runs out, the loom must be stopped. The arrangement which is the object of the present invention takes these circumstances into account and possesses moreover a certain number of advantages which will be explained in the course of the present specification.

In the accompanying drawings: Figs. 4 to 7 details of apparatus for actuating the cop feeler (plan view and several sections).

The weft fork 1, is pivoted upon a slide 34, and, when the loom is working properly, is usually depressed (see Figs. 8 and 16) at its free end by the warp thread, in such a way that its hooked end, towards the front of the loom, is not likely to be engaged by the hammer 2, which is constantly oscillating to and fro. If, however, the weft thread breaks or is absent, the outer end of the fork 1 is not depressed, and its hook falls and engages the hammer 2 (see Fig. 3); as a result, the fork and the slide 34 are displaced or drawn back by the hammer 2.

Figure 1:
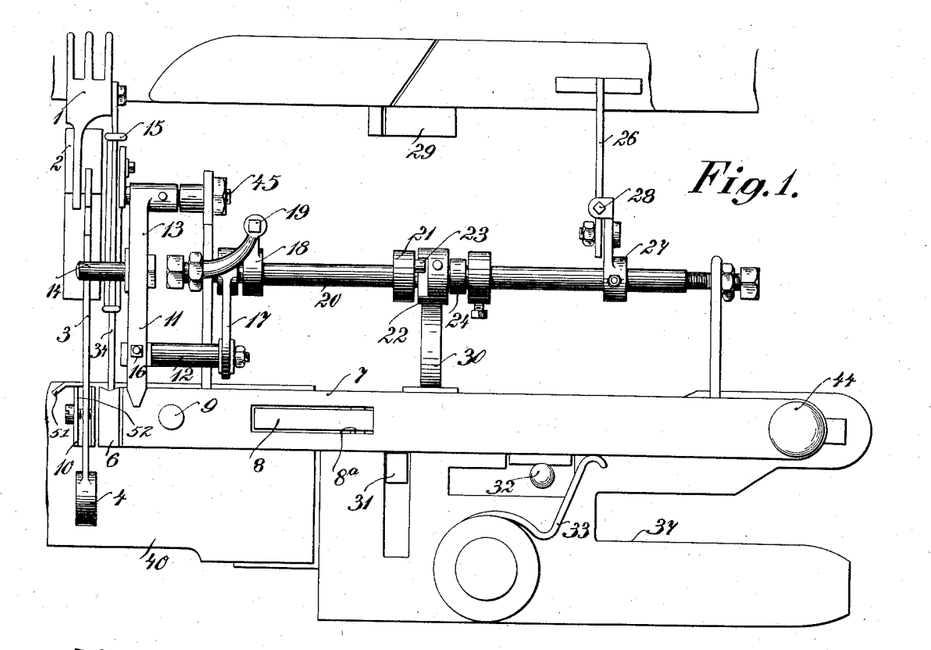
—Figure 1 is a plan of the entire arrangement.
Figure 2:
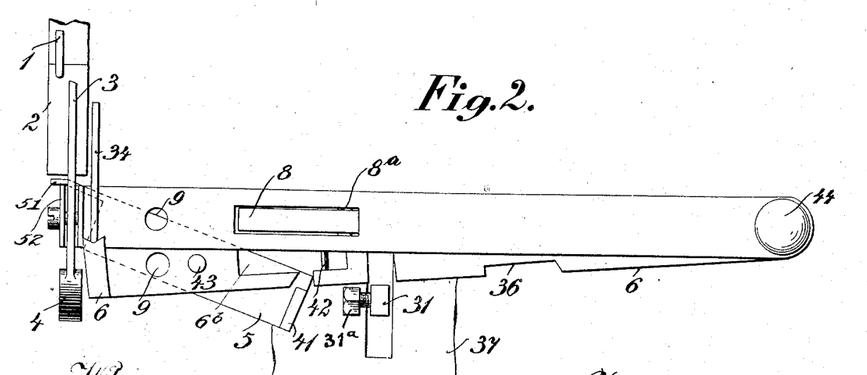
Fig. 2 plan of the lever apparatus which is employed for operating different parts.
Figure 10:
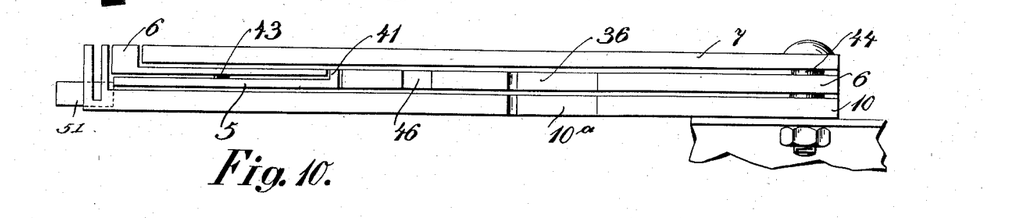
Fig. 10 front elevation of the levers 6, 7, and 10.
Figures 11, 12:
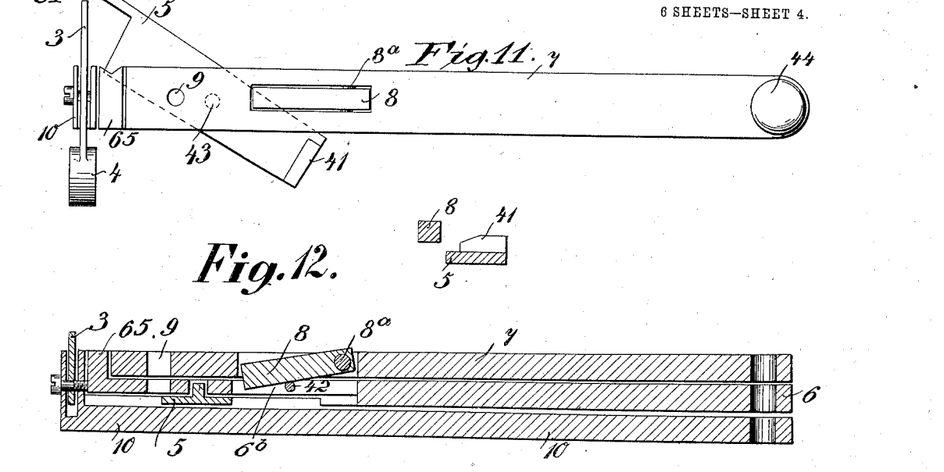
Fig. 11 plan of the lever apparatus when the two upper levers are locked together.
Fig. 12 longitudinal section through Fig. 11.
Figure 13:
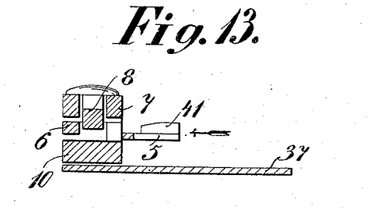
Fig. 13 cross section through the locking tongue 8.

The slide 34 which slides through a guide bracket 15 is in contact with a part 65 of a lever 6 Fig. 2. which is covered over by an upper lever 7 (Figs. 9, 10, 12.) and rests on a third lever 10. The three levers 6, 7 and 10 which lie one upon the other are all fulcrumed upon a common spindle 44 of a plate 37 which is fitted on the right side of the breast beam. The three levers are free above the breast beam, cover one another and are actuated by three strong springs 33 (Fig. 1.) which are also superimposed and which tend to press back the three levers towards the back of the loom into their position of rest, when the pin 44 has been loosened all three levers can easily be removed if necessary, replaced by others or repaired and with equal ease be reinstated in their working position.

The center lever 6 has a recess 6ᵇ into which the coupling tongue 8 can fall in order to connect the center lever 6 with the top lever 7 so that both levers turn on their common pivot 44 as if they were one. The coupling tongue 8 which is pivoted on pin 8ª (Fig. 12.) in the top lever rests when in action or coupling the levers on a pin 42 in the recess of the center lever, which limits the movement of the tongue.

Figure 15:
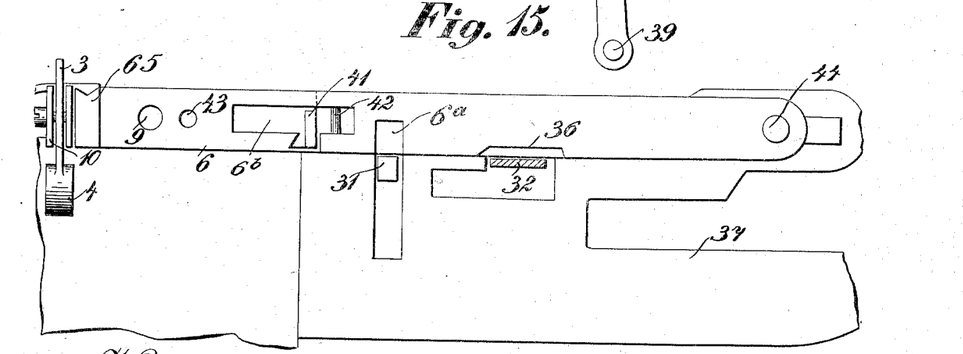
Fig. 15 plan of the center lever 6 with the top lever removed.

The coupling tongue 8 is usually held in its raised non-working position by a plate 5 on pin 43 (Fig. 2.) on the center lever 6 in which position it lies level with the upper and lower surface of the lever 7. Then when the plate 5 assumes the position shown on Fig. 2. the tongue 8 falls down by the force of its own gravity and engages in the recess of the center lever 6 coupling or connecting both levers together. The center lever 6 which has an angular projection 65 and usually occupies the position shown in Fig. 15 is displaced or moved back by the slide 34 when a thread breaks, (as seen in Fig. 2.), as soon as it is caused to slide by the weft hammer 2 and the plate 5 on pivot 43 is also displaced because its projecting tongue shaped end 51 is prevented by a stop 52 from following the swing of the lever 6 so that the plate takes up the position shown in Fig. 2. This displacement takes place when the weft hammer 2 advances. As soon as the hammer recedes the center lever is brought back by its spring into its original position and also moves the slide 34 again into its position of rest.

Figure 14:
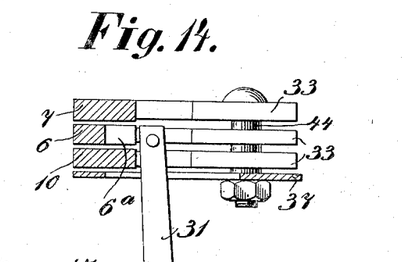
Fig. 14 section showing vertical lever 13 controlling the bobbin changing mechanism.

When the lever 6 is first displaced it partly rotates a rocking shaft 39 by the aid of an arm 31 thereon (Figs. 2 & 14) by which the bobbin changing mechanism is put into operation in the usual way a new bobbin being pressed into the shuttle and the old one ejected. The weft thread from the fresh bobbin (provided the change of bobbins has been effected properly) presses the weft fork 1 down at once: Consequently the weft hammer 2 on its renewed advance does not catch the weft fork and does not move the slide 34 with it. The front end of the weft hammer 2 strikes against the projecting part of the plate 5 (Fig. 2) and rotates the same again upon its pivot 43 back to its original position so that the plate covers the recess in the center lever 6 and the angular projection 41 on the end of the plate raises the tongue 8 and thereby uncouples or disconnects the top lever 7 and the center lever 6. Therefore, when the weft thread breaks once, the weft fork 1 and with it the slide 34 are carried forward by the weft hammer 2 on its advance, lever 6 and its plate 5 are displaced so that the tongue 8 falls down and the top lever 7 and the center lever 6 are made ready for coupling, during which the plate preserves the oblique position arising from its displacement even when the weft hammer and the lever 6 recede, so that the top lever 7 and the middle lever 6 are temporarily coupled, but they are uncoupled, when the weft hammer moves forward a second time as the latter carries back plate 5 into its position of rest as the shoulder 41 of the plate 5 again raises the tongue 8. The first displacement of lever 6 sets in operation the bobbin changing mechanism and in case this takes place properly all the parts resume their original positions when the weft hammer advances a second time. Should the weft thread for any reason fail twice say owing to the change of bobbins not being properly carried out and the weft fork 1 as well as the slide 34 be carried forward with the weft hammer when it advances twice in succession, then during the second advance of the weft hammer not only is the center lever 6 carried forward with it, but the top lever 7 also follows the movement of the bottom lever and the loom stops at once. In order to effect this the notch or recess 36 (Fig. 2.) in the edge of the center lever 6 embraces the loom stop lever 32 (Figs. 3 & 9) so that when lever 6 is alone displaced it does not carry the stop lever forward with it. The stop lever 7 has however no such notch or recess and when it is displaced presses against the stop lever 32 which is then lifted out of its notch in the usual way and moves the driving belt from the fast to the loose pulley thus stopping the loom.

From the above description it is clear that after the weft hammer 2 has advanced and receded once, provided that the latter on the first breakage of the thread carried the weft fork and the slide 34 with it, it displaced the middle lever 6 and the plate 5 in such a way that the plate 5 even after the lever 6 has been restored to its position of rest, preserves the position shown in Fig. 2. so that the coupling tongue 8 of the top lever 7 engages with the recess in the center lever 6. Now if while this plate is still in an oblique position, the weft hammer should carry the slide 34 with it a second time, the middle lever 6 would also be carried forward by this slide and the plate 5 would follow this movement in its oblique position, as it is pivoted to the lever on pin 43: Consequently its projecting end cannot be struck by the weft hammer 2. Therefore the plate will not be returned back into its original position by the hammer and as in the oblique position of the plate the center lever 6 and the upper lever 7 are coupled the latter will follow the forward movement of the lever 6 and stop the loom immediately. Therefore if the weft thread fails once a change of bobbins takes place, and if it fails twice in succession the loom stops.

The action we have just described in which only the center and top levers take part, is used when plain goods are being woven: As regards these if the weft thread fails once the loom should not be stopped but only if it should fail twice in succession, that is, when the shuttle picks twice without leaving a weft thread. In order to meet these different requirements an appliance is provided for connecting the top and center levers firmly together for which purposes both are perforated with a hole 9 (Figs. 2 & 15.) the hole in one being opposite to that in the other. When required a pin is inserted in those holes so as to lock the two levers together. Further the center lever 6 is provided with a notch or recess 6ª (Figs. 14 & 15) which can embrace the arm 31 which operates the change of bobbins. But in the action described the notch or recess 6ª does not come into operation as a stud or pin 31ª is screwed into the top end of the arm 31 and against the projecting head of this stud (Fig. 2.) the center lever 6 presses when it swings forward and moves arm 31 which actuates the change of bobbins.

When fancy goods are being woven the stud 31ª is taken away and by means of the holes 9 and a pin therein the levers 6 and 7 are locked together so that whenever a weft thread breaks, both levers are moved forward by the displacement of slide 34 and the loom is stopped by the top lever 7 in the manner described, while simultaneously the recess 6ª embraces the arm 31, without rocking the shaft 39 and accordingly a change of bobbins does not take place. Whenever therefore the weft thread fails owing to a breakage of same or the bobbin being quite empty etcetera the loom is stopped without a change of bobbins taking place.

Figure 3:
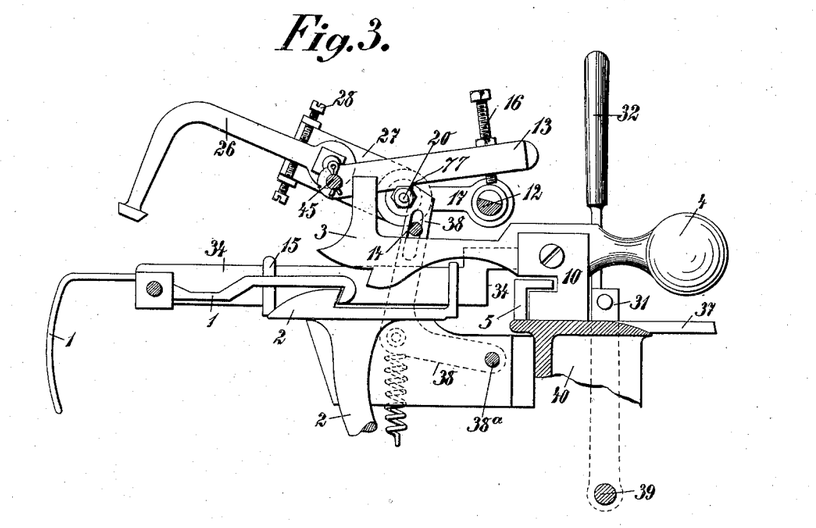
Fig. 3 side elevation of the whole apparatus.
Figure 4:
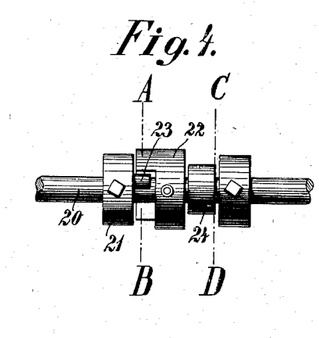
Figure 5:
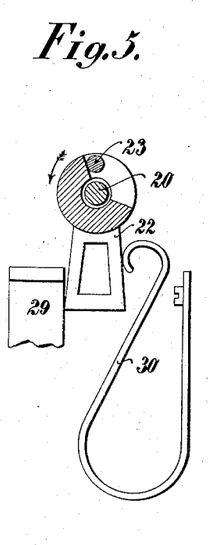
Figs. 5 and 6 section on line A B of Fig. 4 in two positions of the parts.
Figure 6:
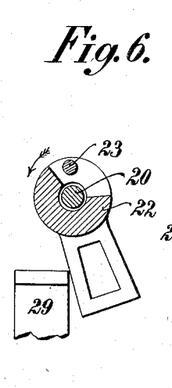
Figure 7:
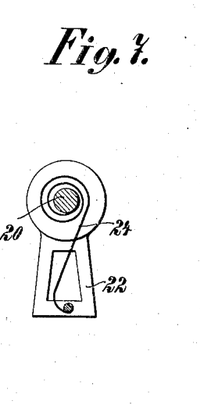
Fig. 7 section on line C D of Fig. 4.
Figure 8:
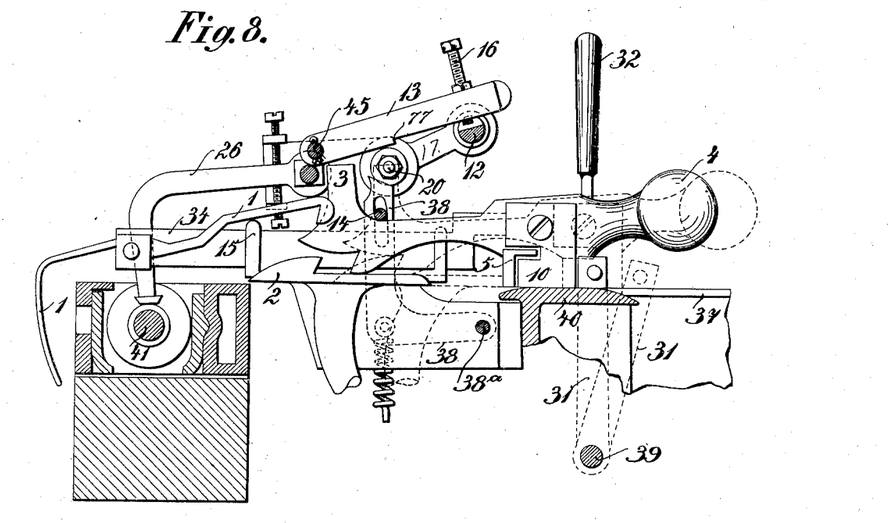
Fig. 8 side elevation of the whole apparatus in which a second position is shown by dotted lines.

The change of bobbins is controlled by the bobbin feeler 26 which acts upon the arm 31 to operate the bobbin changing mechanism as follows:—In order that the feeler 26 may only operate when required, say for instance when fancy goods are being woven, it is controlled by a special arrangement which moves with the slay. On the front of the right shuttle box an arm 29 is affixed to a spring tongue or swell which is pressed forward by the shuttle when it enters the shuttle box. The arm 29 is adjusted by the weaver before he commences to weave fancy goods into its working position. Each time the slay moves forward the arm 29 strikes a depending arm 22 in the way shown in Figs. 5 and 6 provided a shuttle has entered the shuttle box. The arm 22 is pivoted loosely on the shaft 20 and is actuated by a spring 30; it can therefore be moved independently of the shaft 20. The shaft 20 on its part is subject to the action of a spiral spring 24 (Fig. 7.) which tends to turn the said shaft in the same direction (that shown by the arrows in Figs. 5 and 6) as that in which the arm 22 is moved by the arm 29 on the shuttle box. Ordinarily however the spring 24 cannot rotate the shaft 20 as a pin 23 projecting from the face of a disk 21 affixed thereto (Figs. 1 and 4.) rests against the side of a notch or flange of the sleeve of arm 22 (Fig. 5.) When the arm 22 is displaced or moved round the shaft 20 as shown in Fig. 6. by the arm 29 on the forward movement of the slay then the pin 23, its disk 21 and the shaft 20 follow the movements of the arm 22 provided there is nothing else to prevent them. To the shaft 20 there is also affixed an arm 27 which carries the bobbin feeler 26 the position of which is adjustable by the screws 28. (Figs. 1, 3 and 8).

The bobbin feeler 26 only admits of shaft 20 being rotated as above mentioned if it is not prevented by the bobbin. After the shuttle has entered the right shuttle box it is true that as the slay moves forward the arm 22 is always carried forward with it by the arm 29 and is brought into the position shown in Fig. 6. but the shaft 20 can only follow the movement of the arm 22 when the weft on the bobbin A (Fig. 8.) is used up to a certain point as the feeler 26 can then without being prevented by the weft material descend sufficiently far to admit of a rotation of the shaft 20 to the required extent. As long as the bobbin is sufficiently full the shaft 20 at every stroke of arm 22 during the forward movement of the slay can only be rotated as far as the feeler which strikes the weft bobbin will permit. The shaft 20 carries an arm 17 (Figs. 1, 3 and 8.) provided with a stud 12 at its free end. The end of the stud is flat and knocks against a screw 16 (Figs. 3 and 8.) projecting from a lever 13 pivoted on a stud 45 as soon as the shaft 20 turns sufficiently and raises the lever 13. When the stud 12 raises the lever 13 by the aid of the screw 16 a cranked lever 38 pivoted on pin 38ª is released from a corresponding projection or notch 77 on the under side of the lever 13 against which it usually rests, whereupon the lever 38 actuated by a spring swings round the pin 38ª on which it is pivoted. The pin 14 then presses down the end of the lever 3 which is usually maintained in the position shown in Fig. 3 by a weight 4 on the other end. The lever 3 is pivoted to the free end of the bottom lever 10 and on the under side at its free rear end it is shaped with a projection to engage the weft hammer 2. When the lever 3 is depressed by the action of the pin 14 on the rotation of the shaft 20 the projection on the under side is brought into the path of the weft hammer 2 by which it is caught and carried forward. In Fig. 8 such a rotation of the shaft 20 is represented as having taken place, that the stud 12 has raised the lever 13 on its pin 45 and released the lever 38 and the pin 14 has depressed the lever 3 overbalancing weight 4.

Figure 9:
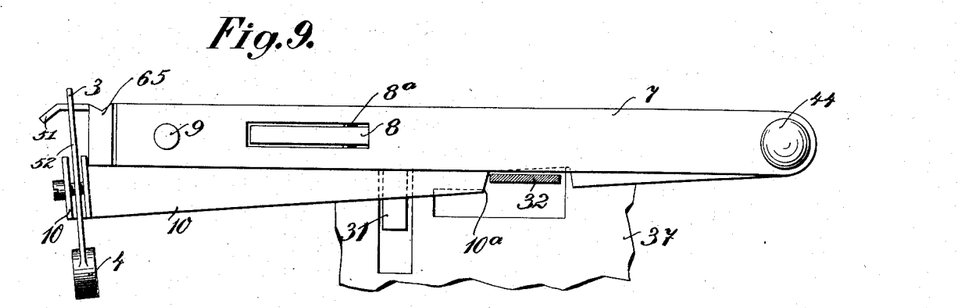
Fig. 9 plan of the levers 6 7 & 10 when the lower lever is operated.

The various parts are represented by continuous lines (Fig. 8) in the position they occupy before the weft hammer 2 has accomplished its forward movement. The dotted lines show the position which the parts occupy when the weft hammer 2 has moved forward. The weft hammer has carried with it the bottom lever 10 by means of lever 3 causing it to turn on its pivot 44 (Fig. 9). As the lever 10 has a notch or recess 10ª in its edge which embraces the stop lever 32 it does not in turning influence the stoppage of the loom, on the other hand when it turns it carries the arm 31 with it which causes the shaft 39 to rotate and thus operates the bobbin changing mechanism.

By means of the weft bobbin feeler 26 and the parts connected with it a change of bobbins is thus effected when the weft on the bobbin A has been used up to within a certain quantity. The stoppage of the loom on the other hand takes place after a second weft failure through the instrumentality of the weft fork, 1.

If no shuttle is in the shuttle box then on the forward swing of the slay the arm 29 which is attached to a spring lever or swell at the front of the shuttle box is not moved sufficiently forward to displace the arm 22 and consequently the shaft 20 (Fig. 5) is not moved. The spring lever or swell at the front of the shuttle box which carries arm 29 is pressed out to some extent only when the shuttle enters the box in order that arm 29 when the slay moves forward may impart the requisite impact to the arm 22. Therefore when no shuttle is in the shuttle box no change of bobbins can take place; on the other hand the loom can be stopped in the usual way by the weft fork and weft hammer mechanism.

Figure 16:
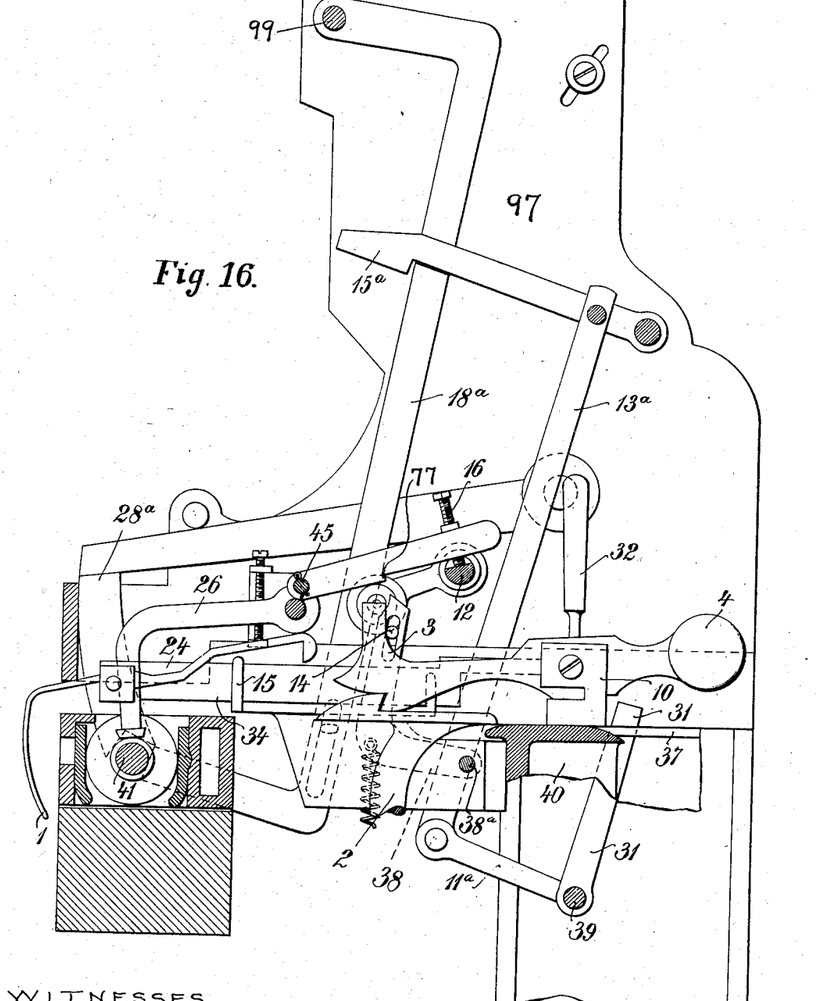
Fig. 16 is a view, partly in section of the new weft-replenishing device in connection with a loom slay and with a bobbin magazine and connections for supplying bobbins singly therefrom.

Fig. 16 is a view, showing the position of the parts of my new weft replenishing device, and the bobbin-changing mechanism thereby controlled, in bobbin feeding position. The arm 31 has been thrown back and has turned the shaft 39; said shaft has raised a short arm 11ª, link 13ª and latch 15ª. Such latch has released a long arm 18ª, which is pivoted, at 99, upon the side of a bobbin-magazine 97 (the mounting and details of which, here immaterial, are fully described and shown in an application, Serial No. 238950, filed December 30, 1904). The released long arm 18ª has been thrown to the position shown, by any suitable spring or weight construction, and as a result of the operation of such construction, a hammer 28ª has been thrown downwardly and has carried a bobbin 41 from the lower end of the bobbin-magazine to the loom slay.

Figure 17:
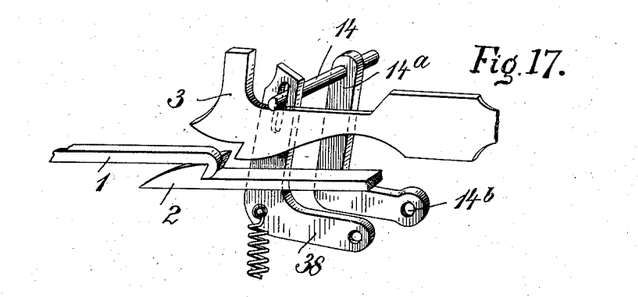
Figs. 17, 18 and 19, are detail views, showing the relation and operation of the lever 3 and of the pin 14.
Figure 18:
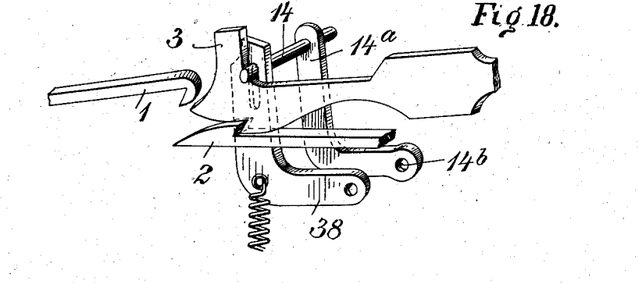
Figure 19:
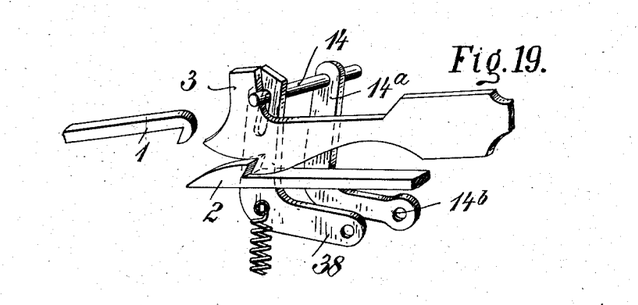

As Figs. 17, 18 and 19 show, the pin 14 is set on an angle lever 14ª which can swing around an axle 14ᵇ and pass by its free end through the longitudinal slot provided in the angle lever 38. As long as the angle lever 38, as shown in Fig. 3, is held against the action of its spring in raised position the various parts assume the position shown in Fig. 17. If the lever 13, Fig. 3, is lifted so that the angle lever 38 can follow the action of its spring freely, this angle lever is pulled down and reaches the position shown in Fig. 18. The pin 14 is thereby pressed down by the lever 38 and brings the two-armed lever 3 into such a position that the weft hammer 2 can seize it. The forward hook-shaped end of this weft hammer is made so broad that the weft fork 1 and the lever 3 find place alongside of each other and that both can come under the action of the hammer. As the weft hammer 2 is moved continuously to and fro it carries along the lever 3 when this is moved down into the position shown in Fig. 18 and shifts it so that it reaches the position shown in Fig. 19. So that the pin 14 should not stand as an obstacle it slides along somewhat ascendingly on the interior edge of the lever 3. This is directly possible because the pin 14 is fixed on the angle lever 14ª which can swing freely around its axle 14ᵇ. The pin 14 is carried by the angle lever 14ª in such a manner that it can follow freely each position of the angle lever 38 of the slot provided therein.

Fig. 16 corresponds to the position of the parts in Fig. 19, while it has been assumed that the two-armed lever 3 has not only entered into engagement with the weft hammer 2 but has also been displaced by the latter.

What I claim and desire to secure by Letters Patent is:

1. Weft changing apparatus for looms, comprising a weft fork, a lever 6 actuated by said fork for operating bobbin-changing mechanism, a second lever 7 for operating loom-stopping mechanism, said levers being normally uncoupled, and means for coupling the levers upon return movement of the first-named lever.

2. Weft changing apparatus for looms, comprising a weft fork, a lever 6 actuated by said fork for operating bobbin-changing mechanism, a second lever 7 for operating loom-stopping mechanism, said levers being normally uncoupled, and means, including a latch on one lever for engaging a recess in the other lever, and a pivoted piece on one lever for operating said latch, for coupling the levers upon the return movement of the first-named lever.

3. Weft changing apparatus for looms, comprising a weft fork, a lever 6 actuated by said fork, for operating bobbin-changing mechanism, a second lever 7 and connections therefrom for operating a loom-stopping lever 32, said levers 6 and 7 being normally uncoupled, and means for coupling the levers 6 and 7 upon return movements of lever 6.

4. Weft changing apparatus for looms, comprising a weft fork 1, an oscillating part 2, a slide 34 coupled with part 2 by the weft fork, a lever 6 actuated by said slide for operating bobbin-changing mechanism, a second lever 7 for operating loom-stopping mechanism, said levers being normally uncoupled, and means for coupling the levers upon return movements of the first-named lever.

5. Weft changing apparatus for looms, comprising a weft fork 1, an oscillating part 2, a slide 34 coupled with part 2 by the weft fork, a lever for operating bobbin-changing mechanism, a second lever for operating loom-stopping mechanism, and connections whereby the slide 34 will operate the two levers in the succession named.

6. Weft changing apparatus for looms, comprising a weft fork 1, an oscillating part 2, a slide 34 coupled with part 2 by the weft fork, a lever 6 for operating bobbin-changing mechanism, a lever 7 and a loom-stopping part 32 operated thereby, a latch on one lever for engaging a recess in the other lever, and a pivoted piece 5 on one of the levers for controlling the latch aforesaid.

7. Weft changing apparatus for looms, comprising a weft-feeler 26 controlled by the unused quantity of weft thread upon a bobbin, a lever 10 for operating a bobbin-changing mechanism, connections whereby the feeler operates said lever, a lever 6 for also operating the bobbin-changing mechanism, and a lever 7 for operating loom-stopping mechanism, and a weft fork and connections for operating lever 6.

8. Weft changing apparatus for looms, comprising a pivoted feeler 26, means for lowering said feeler to the shuttle, an arm 22 for restraining said lowering operation, a spring-controlled stop for controlling said arm 22, connections whereby the slay displaces said arm, and connections from the feeler to a bobbin-changing mechanism.

9. Weft changing apparatus for looms, comprising a pivoted feeler 26, a rotatable shaft 20 controlled by the feeler, a lever 13 lifted by said shaft, a stop lever 38 released by lever 13, a lever 3 controlled by lever 38, connections for operating bobbin-changing mechanism, and an oscillated part 2 with which the lever 3 is arranged to be connected.

In witness whereof I have hereunto set my hand in the presence of two witnesses.

JOSEF BIM.

Witnesses:
ERNST ROHNEN,
OTTO LÔBL.